(12) United States Patent
Ueyoko et al.

(10) Patent No.: US 6,318,431 B1
(45) Date of Patent: *Nov. 20, 2001

(54) HEAVY LOAD RADIAL TIRE WITH SPECIFIED CARCASS TURNUP

(75) Inventors: Kiyoshi Ueyoko, Kobe; Kazuki Numata; Tsuneyuki Nakagawa, both of Shirakawa; Kenji Asano, Hirakata; Masaki Shiraishi, Kobe, all of (JP)

(73) Assignee: Sumitomo Rubber Industries, Ltd., Hyogo-ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/230,581

(22) PCT Filed: Jun. 29, 1998

(86) PCT No.: PCT/JP98/02950

§ 371 Date: Mar. 29, 1999

§ 102(e) Date: Mar. 29, 1999

(87) PCT Pub. No.: WO99/01300

PCT Pub. Date: Jan. 14, 1999

(30) Foreign Application Priority Data

Jul. 1, 1997 (JP) .................................................. 9-175922
Jul. 15, 1997 (JP) .................................................. 9-190073
Jul. 15, 1997 (JP) .................................................. 9-190074

(51) Int. Cl.$^7$ ............................ B60C 15/00; B60C 15/02; B60C 15/024; B60C 15/06

(52) U.S. Cl. ................... 152/543; 152/539; 152/547; 152/552; 152/554

(58) Field of Search ........................... 152/552, 544, 152/554, 547, 539, 543

(56) References Cited

U.S. PATENT DOCUMENTS

6,079,467 * 6/2000 Ueyoko ....................... 152/552 X

FOREIGN PATENT DOCUMENTS

| | | |
|---|---|---|
| A 60-154903 | 8/1985 | (JP) . |
| A 3-204313 | 9/1991 | (JP) . |
| A 4-66309 | 3/1992 | (JP) . |
| A 7-17219 | 1/1995 | (JP) . |
| A 7-17220 | 1/1995 | (JP) . |
| A 7-81335 | 3/1995 | (JP) . |
| A 7-117419 | 5/1995 | (JP) . |
| A 7-144516 | 6/1995 | (JP) . |
| A 7-164840 | 6/1995 | (JP) . |
| A 7-276929 | 10/1995 | (JP) . |
| A 7-285305 | 10/1995 | (JP) . |
| A 8-25923 | 1/1996 | (JP) . |
| A 8-230419 | 9/1996 | (JP) . |
| A 9-277402 | 10/1997 | (JP) . |

* cited by examiner

Primary Examiner—Adriene C. Johnstone
(74) Attorney, Agent, or Firm—Birch, Stewart, Kolasch & Birch, LLP

(57) ABSTRACT

A heavy duty radial tire has a carcass including a carcass ply made of cords arranged at an inclination angle of 70 to 90 degrees with respect to the tire equator, the carcass ply including a main portion extending from a tread portion to a bead core in a bead portion and integrally provided with a turnup portion turned up from the axially inside to the outside at the bead core, a bead apex disposed between the main portion and turnup portion of the carcass ply, wherein the turnup portion extends radially outwardly along the axially outer surface of the bead apex and has a portion extending substantially parallel with and adjacent to the carcass ply main portion from the radially outer end of the bead apex, and the length L of the parallel portion is 1.0 to 8.0 times the maximum section width CW of the bead core.

9 Claims, 12 Drawing Sheets

HEAVY LOAD RADIAL TIRE WITH SPECIFIED CARCASS TURNUP

This application is the national phase under 35 U.S.C. §371 of prior PCT International Application No. PCT/JP98/02950 which has an International filing date of Jun. 29, 1998 which designated the United States of America.

TECHNICAL FIELD

The present invention relates to a heavy duty radial tire of which bead portions can be improved in durability.

BACKGROUND OF THE INVENTION

With the recent improvements in road networks and vehicles' performance, high running performance is required even in heavy duty tires for trucks, buses and the like. In recent years, radial carcass and heavy duty radial tires in which the outside of the radial carcass is tightened by a rigid belt are widely employed. Such heavy duty radial tires are high in the rigidity of the tread portion and excellent in high speed performance, and further they show an excellent wear resistance, mileage and the like.

By the way, during running, a heavy duty radial tire is repeatedly subjected to the large stress in a region from the sidewall portion to bead portion. In this region, very small cracks (hereinafter referred "cracks" simply) are liable to occur due to such stress and ozone in the atmosphere.

The cracks make it impossible to recycle the tires, and there is a possibility that a carcass ply separation is caused if cracks are grown inwardly of the tire.

It becomes clear that, in heavy duty radial tires, especially those which are mounted on a five-degree-taper rim j of which bead seats j1 are tapered at five degrees with respect to the tire axial direction as shown in FIG. 12, since the outer surface of the bead portions comes into contact with a curved surface j2 of the rim flange over a wide range (for example 80% or more), a large strain is produced and heat generation occurs in the contacting part during running.

Such strain and heat, by their multiplier effect, harden or deteriorate the rubber in the bead portions which causes early damages such as cracks, carcass ply separation and the like.

DESCRIPTION OF THE INVENTION

In the inventions set forth in claims 1 to 3, it is an object to provide a heavy duty radial tire in which, by controlling cracks, especially those liable to occur on the surface of the bead portion over a long time period, the bead portions can be improved in durability.

The present inventors discovered that the larger the maximum principal strain at the tire outer surface, the greater the possibility of cracks occurring when the tire mounted on a regular rim is inflated. Further, it was discovered that cracks are liable to concentrate upon spots where strain is relatively large when a maximum principal strain εm is at the tire outer surface in a region between a maximum tire width point at which the tire outer surface is axially outmost and an outer contact point which is the radially outmost point of a contacting region where the bead portion contacts with the rim flange, and when the difference (εm−εp) of the maximum principal strain εm from a maximum principal strain εp at the above-mentioned maximum tire width point are large.

To be effective for controlling maximum principal strain it was discovered to turn up the carcass ply around the bead core from axially inside to outside to form a turnup portion, and to dispose the turnup portion adjacent to and parallel with a main portion to form a parallel portion, and to limit the parallel portion to a length of 1.0 to 8.0 times the maximum section width CW of the bead c ore.

Further, it is an object to further improve the durability of the bead portion by preventing carcass ply separations and preventing cracks. For this purpose, a side packing rubber having a 100% modulus of 14 to 65 kgf/sq.cm more preferably 47 to 60 kgf/sq.cm is disposed on the axial outer surface of the carcass ply turnup portion, and the position of the radially outer end thereof is limited.

Furthermore, in order to further prevent the above-mentioned cracks and separations, the ratio (St/S) of a contact length St of the outer surface of the bead portion with the curved flange surface and a curved length S of the curved flange surface is set to be 0.2 to 0.70, more preferably 0.4 to 0.65.

In this specification, the "regular rim" is a rim having dimensions specified an a standard rim specified by JATMA, a "Design Rim" by TRA, or a "Measuring Rim" by ETRTO. The "regular inner pressure" is a maximum air pressure specified by JATMA, a maximum value specified in the "Tire Load Limits At Various Cold Inflation Pressures" table of TRA, or a "Inflation Pressure" specified by ETRTO.

BRIEF EXPLANATION OF THE DRAWINGS

More specific features of the present invention and their advantages will become evident from the description of a preferred embodiment of the present invention given hereinbelow in conjunction with the drawings, wherein.

BEST MODE FOR PRACTICING THE INVENTION

An embodiment of the present invention will now be described according to the drawings.

Figure 1:
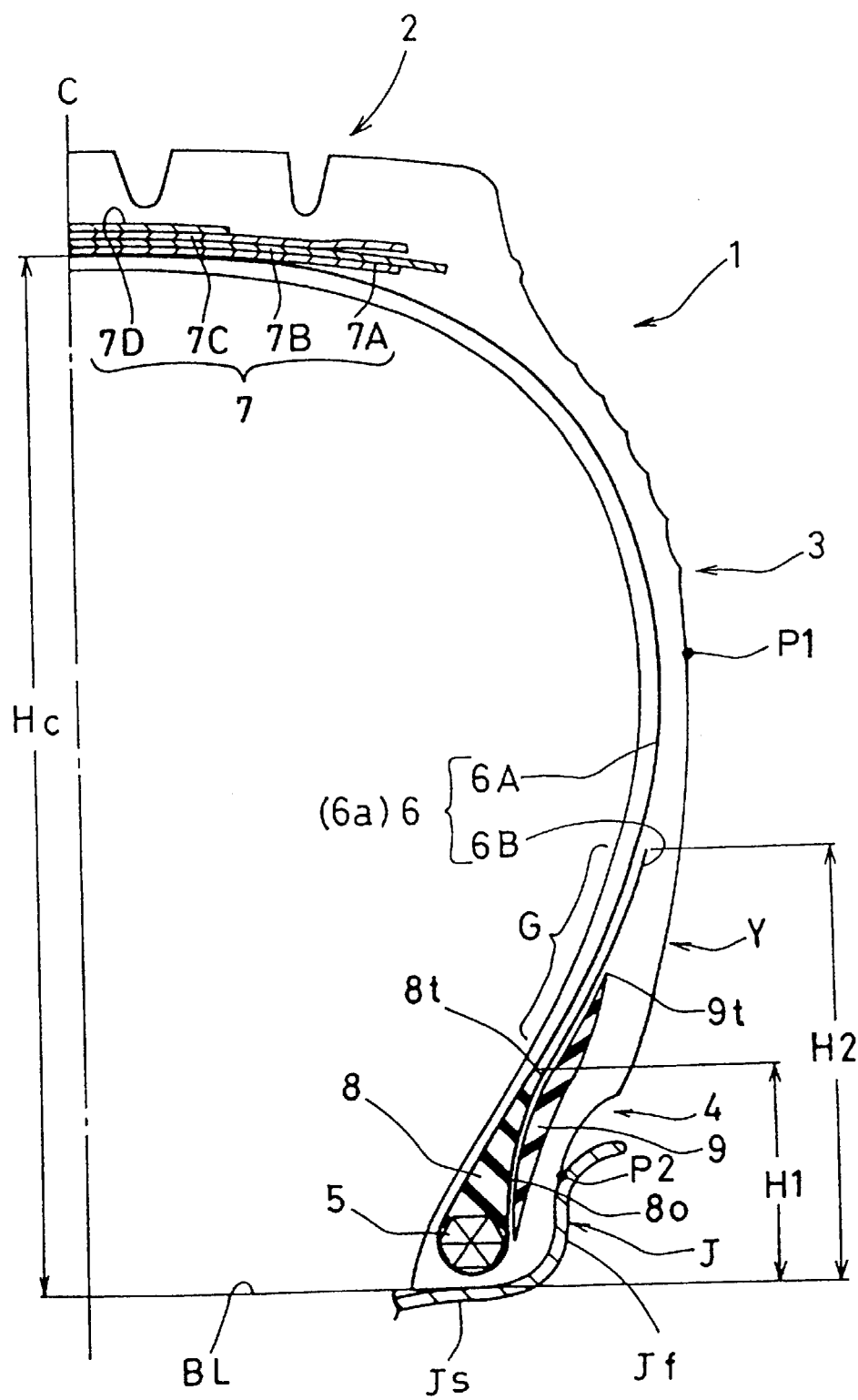
FIG. 1 is a cross sectional view (right half) of a tire which is an embodiment of the present invention.

FIG. 1 shows an assembly of a rim and a heavy duty radial tire 1 (hereafter, occasionally it will be called simply 'tire 1') under a normal state in which the tire is mounted on a regular rim J and inflated to a regular inner pressure and loaded with no load. In this figure, a right half and a left half appear substantially symmetric.

Figure 2:
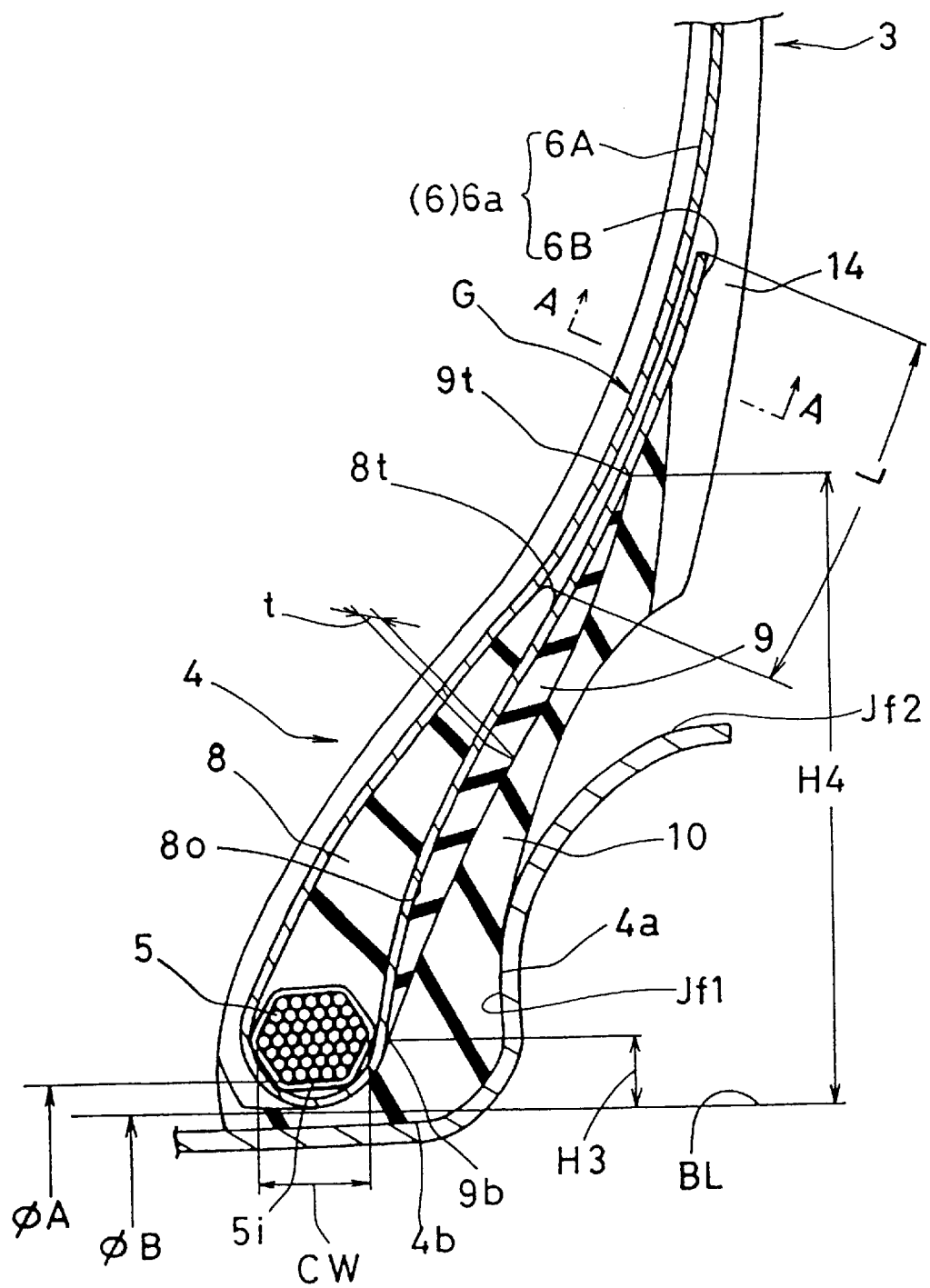
FIG. 2 is an enlarged cross sectional view of a bead portion thereof.

As for the above-mentioned rim J, a five-degrees-taper rim is shown in this embodiment, which comprises a rim seat surface Js tapered at five degrees with respect to a tire axial line (a tolerance of plus/minus 1 degree is permitted) and a fixed flange Jf on one side thereof. As shown in FIG. 2, the fixed flange Jf has, at the radially outer end of a rim flange face Jf1 which defines the rim width, a flange arc part Jf2 curved with an arc angle of substantially 90 degrees.

In FIG. 1 and FIG. 2, the tire 1 comprises a tread portion 2, a pair of sidewall portions 3 extending radially inwardly from both ends thereof, and a bead portion 4 located at an inner end of each of the sidewall portions 3. Further, the tire 1 comprises a carcass 6, which, for example comprises a single carcass ply 6a in which a main portion 6A and turnup portions 6B are formed in one body, the main portion 6A extending from the tread portion 2 to bead cores 5 in the bead portions 4 through the sidewall portions 3, and the turnup portions 6B being turned up around the bead cores 5 from axially inside to the outside thereof. It is helpful for reducing the tire weight to form the carcass 6 with a single carcass ply 6a as explained above.

In the above-mentioned carcass ply 6a, carcass cords are arranged at an angle of from 70 to 90 degrees with respect to the tire equator C. For the carcass cords, steel cords are preferably used, but organic fiber cords, e.g. nylon, rayon, polyester, aromatic polyamide and the like can be used if need be. In this embodiment, shown as the carcass 6 is an example which is made up of a ply of an array of steel cords which are rubberized with topping rubber having a 100% modulus Mt of 37 to 47 kgf/sq.cm and inclined at an angle of substantially 90 degrees with respect to the tire equator C.

Further, a belt 7 is disposed radially outside the carcass 6 and inside the tread portion 2. As the belt 7 in this embodiment, an example of four-ply structure is shown, wherein an innermost belt ply 7A of steel cords inclined at for example an angle of about 60 plus/minus 10 degrees with respect to the tire equator C and belt plies 7B, 7C and 7D of steel cords inclined at small angles of not more than 30 degrees with respect to the tire equator C are disposed one upon another so that, for example, at least two plies cross each other.

In the belt 7, other cord materials such as rayon, nylon, aromatic polyamide, nylon and the like can be used according to the need.

In the above-mentioned bead portion 4, a bead apex 8 made of hard rubber tapering radially outwards from the bead core 5 is inserted between the main portion 6A and turnup portion 6B of the carcass ply 6a. The radial height H1 of the bead apex 8 measured from the bead base line BL to the outer end 8t as shown in FIG. 1 is 6 to 35%, preferably 9 to 25%, more preferably 15 to 25% of the carcass section height Hc. In this embodiment, it is set at about 21%.

The 'bead base line BL' is defined as an axial line passing through the position corresponding to the rim diameter under the above-mentioned normal state. The 'carcass section height' is defined as the radial distance from the bead base line BL to the radially outer extreme end of the carcass 6 under the normal state.

The bead apex 8 in this embodiment is preferably made of rubber having a 100% modulus Ma of from 14 to 84 kgf/sq.cm, preferably 55 to 84 kgf/sq.cm, more preferably 64 to 84 kgf/sq.cm, and as shown in FIG. 2, the axial outer surface 8o is defined by an axially inwardly swelling smooth arc.

If the 100% modulus Ma of the bead apex 8 is more than 84 kgf/sq.cm, the rigidity of the bead portion 4 becomes excessively high, and the carcass cords can be easily bent partially near the radially outer end of the bead apex 8. Thus, there is a tendency such that the carcass cord strength is decreased and loose ply is caused. If the 100% modulus Ma of the bead apex 8 is less than 55 kgf/sq.cm, the necessary rigidity for the bead portion 4 can not be obtained, and there is a tendency such that the steering stability decreases greatly.

As for the bead core 5 in this embodiment, an example made of a steel wire which is spirally wound a predetermined number of times and bunched into a substantially hexagonal section shape is shown. The periphery thereof is coated with rubber for example. As shown in FIG. 2, the radially inner side 5i of the bead core 5 extends along an axial line. Since the tire 1 in this embodiment is mounted on a five-degree-taper rim, the inside diameter $\phi A$ of the bead core 5 at the above-mentioned inner side 5i must be larger than the nominal diameter $\phi B$ of the regular rim J.

If the inside diameter $\phi A$ of the bead core 5 is less than the nominal diameter $\phi B$ of the regular rim J, problems arise, for example the cords of the carcass 6 are exposed in a bead seat surface, or it can not be mounted on a regular rim. Incidentally, for the wire material of the bead core 5, an aromatic polyamide can be used in addition to steel.

The above-mentioned turnup portion 6B of the carcass ply 6a is preferably ended at a position of height H2 where the strain under load is relatively small. To put it concretely, it extends radially outwardly beyond the outer end 8t of the bead apex 8. But it is better to avoid the maximum tire width point P1 where the outer surface of the tire is axial outmost. These help to decrease the concentration of strain on the outer end of the turnup portion 6B and thus to prevent separation.

The above-mentioned turnup height H2 of the carcass ply 6a shown in FIG. 1 is 20 to 60%, preferably 30 to 60%, more preferably 35 to 45% of the carcass section height Hc from the bead base line BL. In this embodiment it is set at about 41%. If the height H2 of the radially outer end of the turnup portion 6B is less than 30% of the carcass section height Hc, there is a tendency such that strain concentrates on the outer end of the turnup portion 6B and separations are liable to occur. If the height H2 of the radially outer end of the turnup portion 6B is more than 60% of the carcass section height Hc, the improvement in the durability reaches to its limit, and the tire weight is increased. Thus it is not preferable.

The turnup portion 6B of the carcass ply in this embodiment extends radially outward along the outer surface 8o of the bead apex rubber 8 while swelling inwardly first, and then approaches the main portion 6A of the carcass ply from a position substantially equal to the outer end 8t of the bead apex rubber 8, and thereafter extends substantially parallel therewith to form a parallel portion G, and finally terminates.

For example under the above-mentioned normal state, the length L of the parallel portion G (measured therealong) is 1.0 to 8.0 times, preferably 2.0 to 8.0 times, more preferably 3.5 to 6.5 times, still more preferably 4.0 to 6.0 times the maximum section width CW of the bead core 5 (measured on the wire). In this embodiment, the parallel portion G is about 5.0 times the maximum section width CW of the bead core. The parallel portion G helps to control the maximum principal strain on the outer surface of the bead portion.

In this embodiment, the parallel portion G is formed, and when the tire condition is changed from a tentative state in which the tire 1 is mounted on a regular rim J and inflated to 0.5 kgf/sq.cm to the normal state in which the tire is inflated to a regular inner pressure, the maximum principal strain $\epsilon m$ on the surface of a region Y which region is defined between the above-mentioned maximum tire width point P1 and an outer contact point P2 which is the radially outmost point of the contacting region of the bead portion 4 contacting with the flange Jf of the rim J is set to be not more than 4%; and further the difference ($\epsilon m-\epsilon p$) between the above-mentioned maximum principal strain $\epsilon m$ in the region Y and the maximum principal strain $\epsilon p$ at the maximum tire width point P1 is set to be less than 2%.

It was discovered that if the length L of the parallel portion G is less than 1.0 times the maximum section width CW of the bead core, a distinct peak appears in the maximum principal strain $\epsilon m$ in the region Y, and cracks occur relatively early, concentrating upon the position of the peak. Contrary, if the length L of the parallel portion G exceeds 8.0 times the maximum section width CW of the bead core, the improvement in the bead durability reaches to its upper limit, and the tire weight increases. Thus it is not preferable.

Figure 3:
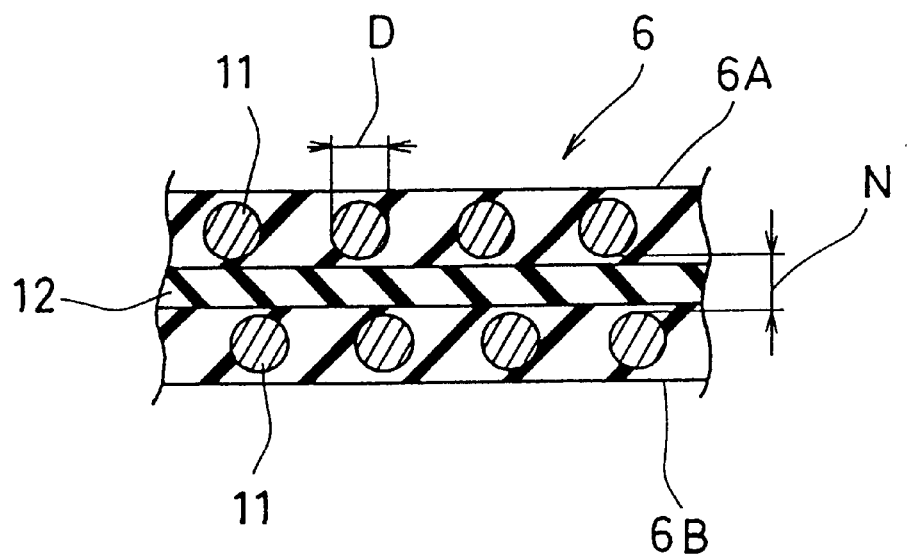
FIG. 3 is a view of cross section A—A of FIG. 2.

In this example, the radially inner end of the parallel portion G is located on the radially outside of the outer end of the rim flange Jf. FIG. 3, which is the A—A cross section of FIG. 2, shows an example in which the carcass ply turnup portion 6B is close to the main portion 6A in the parallel portion G. In the figure, the distance N between the carcass cords of the main portion 6A of the carcass ply 6a and those of the turnup portion 6B is for example set in the range of from 1.0 to 4.5 times, preferably 1.5 to 3.5 times the diameter D of the carcass cords 11.

The parallel portion G mitigate S a shearing force between the carcass cords of the carcass main portion 6A and turnup portion 6B by the elasticity of rubber material existing between the carcass cords, and further it has a function to reduce strain on the surface of the bead portion.

If the cord distance N is less than 1.0 times the carcass cord diameter D, the carcass cords 11 are apt to adjoin each other, and the sharing-force-mitigating-effect by the rubber between cords becomes insufficient. Further, the carcass cords 11 are in danger of partially contacting each other, and thus, there is possibility of causing cord loose. Further, if the cord distance N is more than 4.5 times the carcass cord diameter D, even when the main portion 6A and turnup portion 6B are parallel each other, the effect to reduce the maximum strain $\epsilon$ on the outer surface of the region Y is apt to decrease. Further, the thickness of the bead portion 4 is increased more than is necessary, and it is not preferable from a point of view of heat generation.

As for the rubber material between the carcass cords 11, 11 in the parallel portion G, the above-mentioned topping rubber for the carcass ply 6a can be used, but in this embodiment, a separate cushion rubber layer 12 is disposed between the carcass ply main portion 6A and turnup portion 6B. For the cushion rubber layer 12, it is possible to use substantially same rubber materials as the topping rubber and hard rubber materials having substantially same hardness as the bead apex 8 so as to be able to reinforce the bead portion 4.

Figure 4:
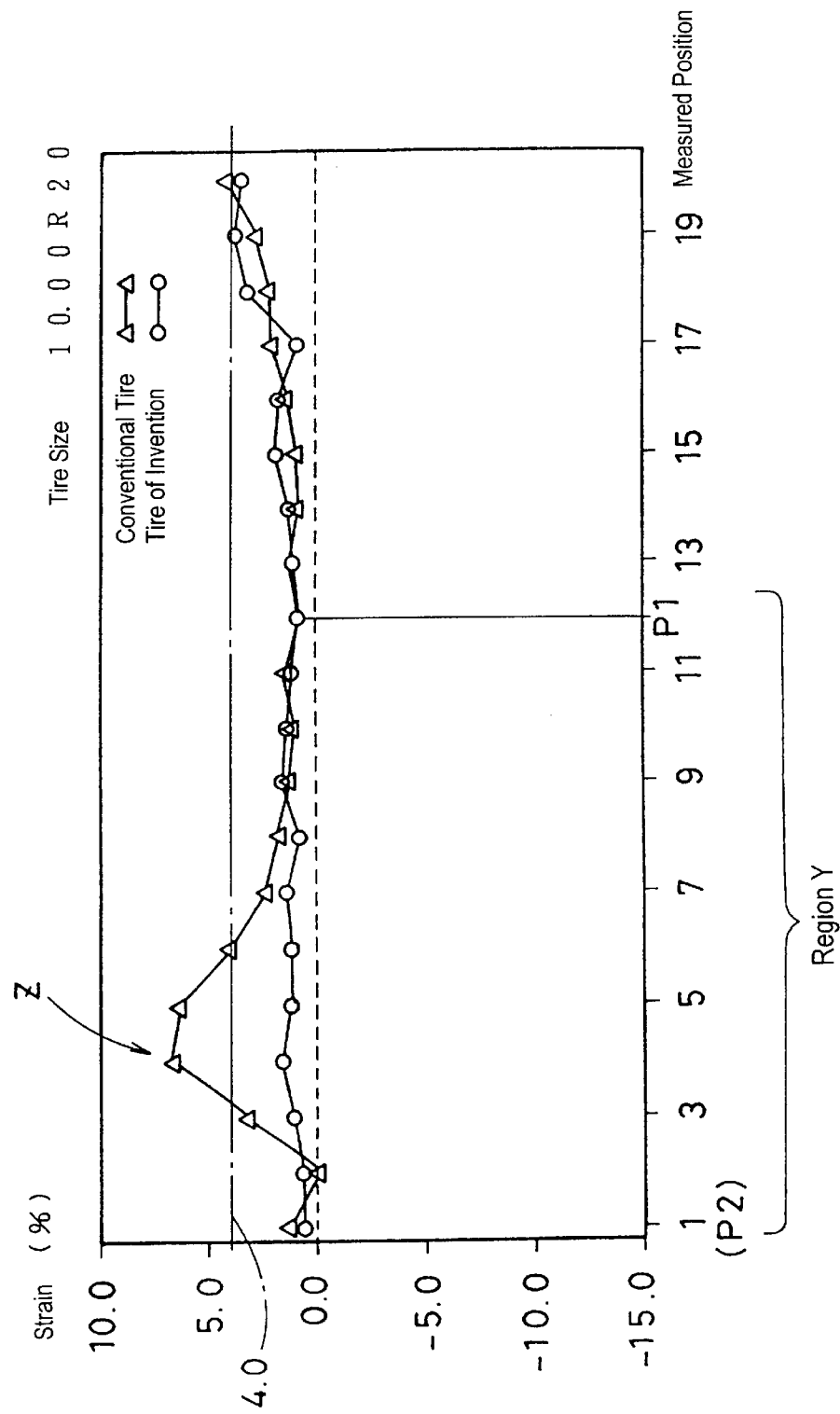
FIG. 4 is a graph showing the results of measured maximum principal strain.

FIG. 4 shows the results of measurement on a conventional tire (tire of FIG. 12 having no parallel portion) and a tire of the present invention, wherein the strain in the region Y between the tire outmost point P1 and outer contact point P2 was measured. As apparent from FIG. 4, in the conventional tire, the maximum principal strain $\epsilon m$ in the region Y had a peak Z of 7 to 8% under the above-mentioned inflating condition change. On the contrary, in the conventional tire, it decreased to about 2% at the tire outmost point P1. That is, the maximum principal strain $\epsilon m$ was large, and the relative strain or difference ($\epsilon p-\epsilon m$) of the maximum principal strain $\epsilon p$ at the maximum tire width point P1 from the maximum principal strain $\epsilon m$ in the region Y was more than 5%, namely large.

In contrast therewith, in the tire of the present invention, the maximum principal strain $\epsilon m$ could be reduced to under 4% in the whole region Y. Further, in the tire of the present invention, since the difference ($\epsilon p-\epsilon m$) between the maximum principal strain $\epsilon m$ in the region Y and the maximum principal strain $\epsilon p$ at the maximum tire width point P1 is limited to under 2%, the maximum principal strain $\epsilon m$ substantially had no peak, and the relative strain in the region Y was decreased.

Thus, in the tire of this embodiment, the maximum principal strain on the tire surface of the above-mentioned region Y which extends from the sidewall portion 3 to the bead portion 4 can be limited to a very small value, thereby effectively controlling cracks, caused by repeated deformation and ozone in the atmosphere, over an extended period of time. Further, a separation growing from the outer surface of the bead portion 4 toward the inside of the tire can be prevented.

If the maximum principal strain $\epsilon m$ exceeds 4%, due to degradation of rubber caused by the repeated deformation of the sidewall portion during running and ozone in the atmosphere, cracks have a tendency to concentrate on a high-strain spot. Thus, it is not preferable. If there are spots in which the difference ($\epsilon p-\epsilon m$) between the maximum principal strain $\epsilon m$ in the region Y and the maximum principal strain $\epsilon p$ at the maximum tire width point P1 exceeds 2%, the relative strain at the maximum tire width point P1 becomes large, and cracks are apt to concentrate on this point.

Figure 5:
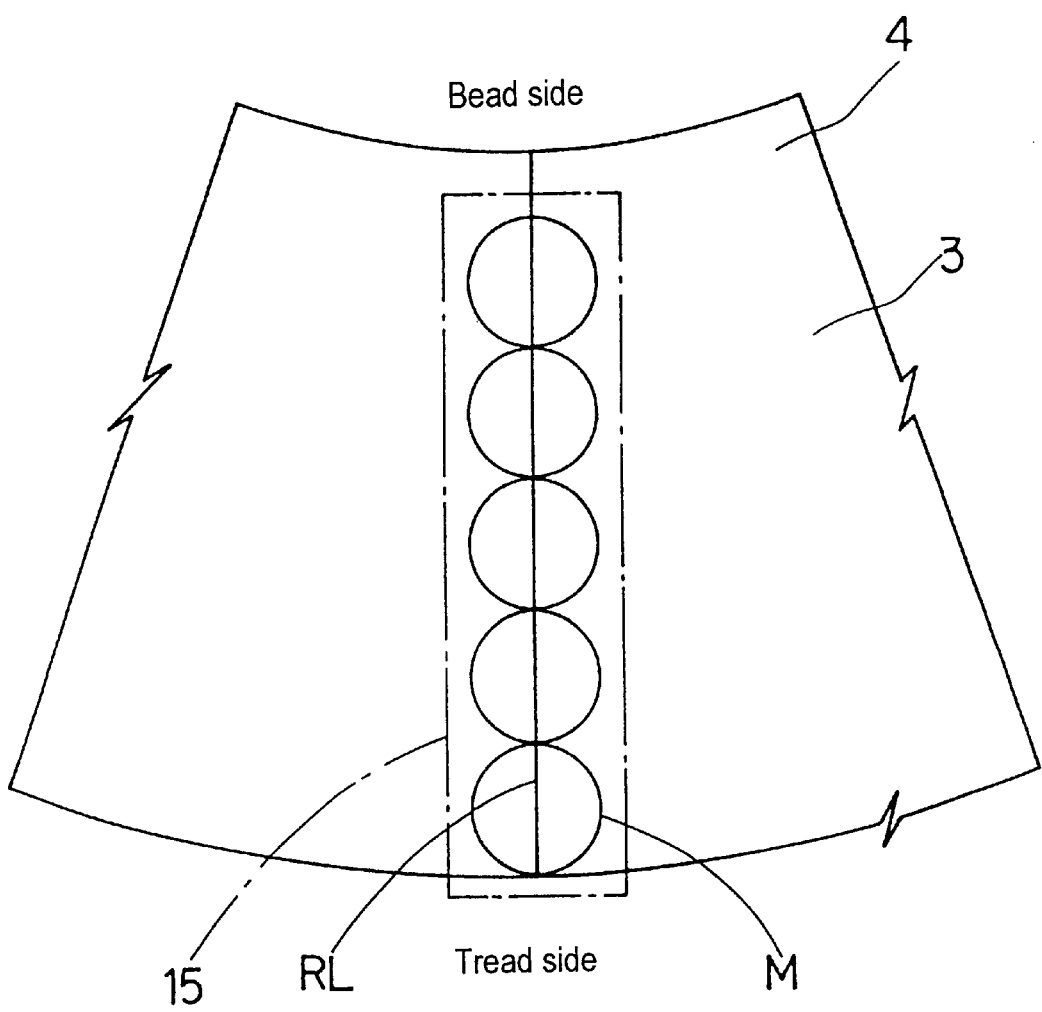
FIG. 5 is a diagram for explaining a method of measuring the maximum principal strain.
Figure 6:
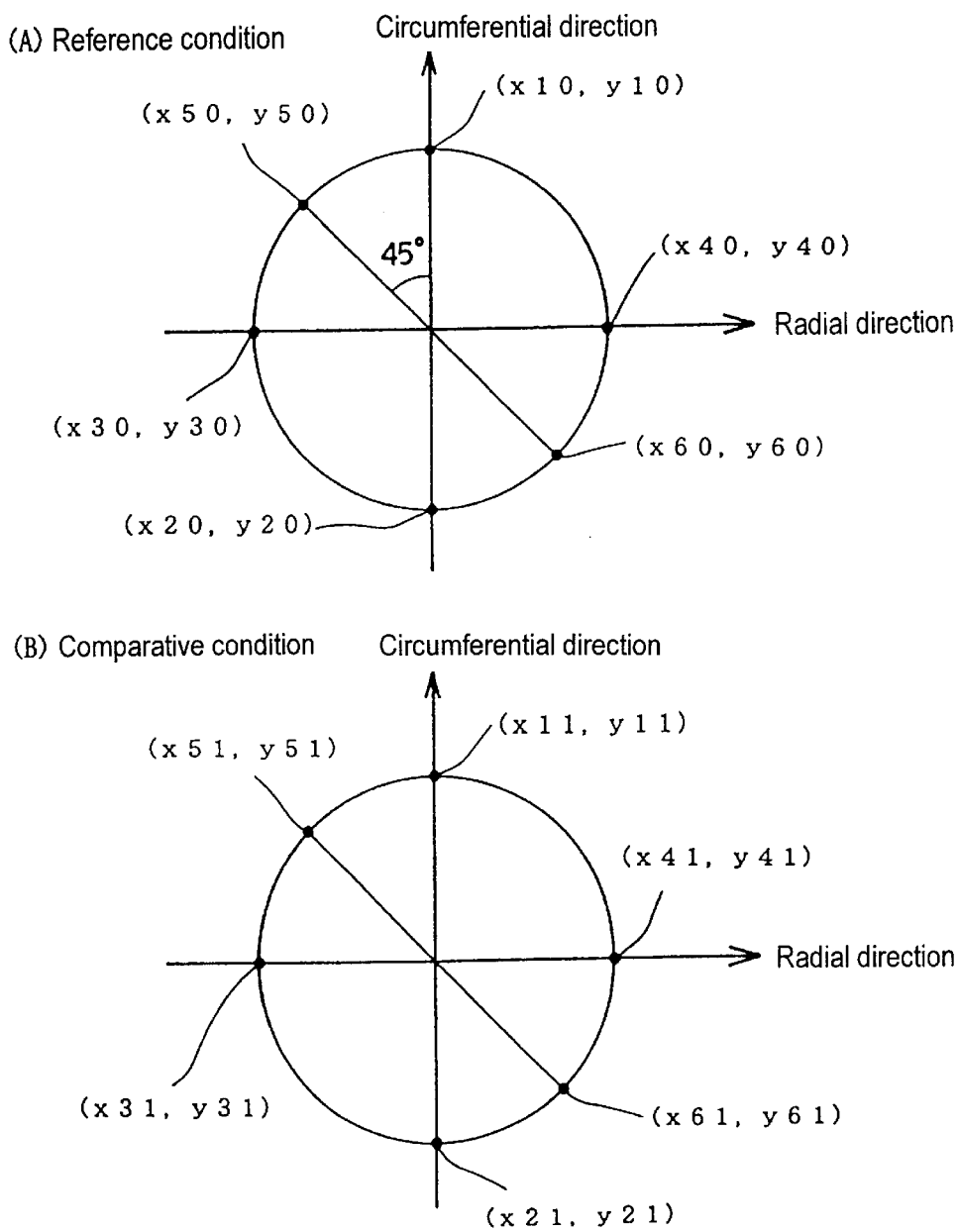
FIG. 6(A) and (B) are diagrams for explaining the positions of markings.

Incidentally, as shown in FIG. 5, the maximum principal strain $\epsilon m$ is measured as follows. First, the surface of the sidewall portion 3 and bead portion 4 of a test tire is buffed and washed with naphtha. A adhesive agent is applied to the buffed surface, and a radially extending measuring reference line RL is drawn. Markings or a series of circles in white ink (titanium oxide+DOP+castor oil) are copied onto a vinyl tape 15 by means of screen printing. Then, to copy the markings, the vinyl tape 15 is applied to the buffed surface of the test tire along the measuring reference line, wherein the tire is mounted on a regular rim and inflated to an inner pressure of 0.5 kgf/sq.cm. Further, after the tire is inflated to a regular inner pressure, the markings on the tire are copied to a blank tape. The markings (under the reference condition in which 0.5 kgf/sq.cm was applied, and the comparative condition in which the regular pressure was applied), obtained as explained above, are enlarged to measure each reference point shown in FIG. 6. The maximum principal strain can be calculated from the following equations 1 to 11.

Equation 1

Under the reference condition, the circumferential length $$Lc0=\{(x10-x20)^2+(y10-y20)^2\}^{1/2}$$

Equation 2

Under the reference condition, the radial length $$Lr0=\{(x30-x40)^2+(y30-y40)^2\}^{1/2}$$

Equation 3

Under the reference condition, the length in a 135 degree direction $$L_{135}\ 0=\{(x50-x60)^2+(y50-y60)^2\}^{1/2}$$

Equation 4

Under the comparative condition, the circumferential length $$Lc1=\{(x11-x21)^2+(y11-y21)^2\}^{1/2}$$

Equation 5

Under the comparative condition, the radial length $$Lr1=\{(x31-x41)^2+(y31-y41)^2\}^{1/2}$$

Equation 6

Under the comparative condition, the length in a 135 degree direction $$L_{135}\ 1=\{(x51-x61)^2+(y51-y61)^2\}^{1/2}$$

Equation 7

The circumferential strain $$\epsilon c=(Lc1-Lc0)/Lc0$$

Equation 8

The radial strain $$\epsilon r=(Lr1-Lr0)/Lr0$$

Equation 9

The strain in 135 degree direction $$\epsilon_{135}=(L_{135}\ 1-L_{135}\ 0)/L_{135}\ 0$$

Equation 10

Searing strain $$=\epsilon c+\epsilon r-2X\epsilon_{135}$$

Equation 11

The maximum principal strain $$\epsilon=(\epsilon c+\epsilon r)/2+\{(\epsilon c-\epsilon r)^2+^2\}^{1/2}/2$$

In this embodiment, on the axially outer surface of the turnup portion 6B of the carcass ply 6a, a side packing rubber 9 having a 100% modulus Mp of 14 to 65 kgf/sq.cm more preferably 47 to 60 kgf/sq.cm and tapering towards the radially inner end and outer end is disposed. The radially outer end 9t of the side packing rubber terminates outside the outer end 8t of the bead apex 8 and in this embodiment inside the outer end of the parallel portion G.

As for the bead portion 4, shown is an example provided with a chafer rubber 10 covering over the axially outer surface of the side packing rubber 9 and exposing in the bead seat surface 4b and the outer surface 4a of the bead portion 4. The chafer rubber 10 preferably has a 100% modulus Mc of 55 to 75 kgf/sq.cm, more preferably 60 to 75 kgf/sq.cm. It is preferable for the chafer rubber 10 to have such a high modulus because the rigidity of the outer surface 4a and bead seat surface 4b of the bead portion 4 contacting with the rim J is suitably increased, and damages due to rim chafing and rim contacting can be effectively controlled.

By providing on the outer surface of the turnup portion 6B of the carcass ply with the side packing rubber 9 and chafer rubber 10 which have 100% moduli adjusted as explained above, it becomes possible to decrease the difference in modulus at the boundary from the topping rubber of the carcass 6, and strain concentration is mitigated and the effect to prevent separations of the turnup portion 6B can be improved.

If the 100% modulus Mp of the side packing rubber 9 is less than 14 kgf/sq.cm, the ability to follow the carcass improves, but the rigidity of the bead portion decreases and the steering stability greatly decreases. On the other hand, the 100% modulus Mp of the side packing rubber 9 exceeds 65 kgf/sq.cm, the modulus difference from the topping rubber of the carcass ply 6a is liable to become large, and the separation-preventing-effect decreases. The difference between the 100% modulus Mt of the carcass cord topping rubber and the 100% modulus Mp of the side packing rubber is preferably not more than 10 kgf/sq.cm, more preferably not more than 5 kgf/sq.cm.

If the outer end 9t of the side packing rubber 9 is positioned inside the outer end 8t of the bead apex 8, the strain-mitigating-effect decreases, which is obtained by following the carcass 6 being bent relatively largely in the outer end portion 8t of the bead apex 8 during running. If the outer end 9t of the side packing rubber 9 extends outwardly so as to cover the outer end of the above-mentioned parallel portion G, it would be possible to prevent the turnup portion 6B from separating. Thus, this is preferable from this viewpoint. Further, as the radially inner end 9b and outer end 9t of the side packing rubber 9 are tapered, the rigidity difference from the surrounding rubber can be minimized to disperse the strain. Thus, this is preferable from this viewpoint too.

In this embodiment, the radially inner end 9b of the side packing rubber 9 is located on an axial line extending axially outwardly from the substantially center of the bead core 5 as shown in FIG. 2. It is preferable for effectively preventing the carcass ply turnup portion 6B from separating to set the height H3 of the inner end 9b in the range of from 1 to 8% of the carcass section height Hc, in this embodiment 4.5%. On the other hand, the outer end height H4 of the side packing rubber 9 is preferably 25 to 65% of the carcass section height Hc, in this embodiment about 31%.

Thus, in this embodiment, the bead apex height H1, the carcass turnup height H2, and the inner and outer end heights H3 and H4 of the side packing rubber satisfy a relationship

H3<H1<H4<H2 but, it may be possible to satisfy

H3<H1<H2<H4.

It is most effective to set the maximum thickness (t) of the side packing rubber 9 (shown in FIG. 2) in the range of from 0.2 to 0.7 times the maximum section width CW of the bead core 5. If the thickness (t) is less than 0.2 times the maximum section width CW of the bead core 5, the side packing rubber 9 has a tendency to relatively decrease its effect to prevent the carcass ply turnup portion 6B from separating. If the thickness (t) exceeds 0.7 times the maximum section width CW of the bead core 5, the rubber thickness of the bead portion 4 is liable to increase, and the heat generation therefrom is also liable to increases.

If the 100% modulus Mc of the above-mentioned chafer rubber 10 is less than 55 kgf/sq.cm, it is liable to become difficult to obtain such a rigidity that makes it possible to endure the contact with the rim J. If exceeds 75 kgf/sq.cm, the rigidity of the bead portion excessively increases. The chafer rubber 10 in this embodiment is connected with a sidewall rubber 14 having a 100% modulus Ms of 10 to 20 kgf/sq.cm and defining the outer surface of the sidewall portion 3.

By disposing the side packing rubber 9, chafer rubber 10 and the like, the rigidity of the bead portion 4 can be properly mitigated and the strain can be broadly dispersed. Thus, the separation-preventing-effect improves. The side packing rubber 9 can prevent the carcass 6 from being bent partially at the outer end 8t of the bead apex 8 and thus a decrease in the strength of the carcass cords near the outer end 8t can be avoided.

Figure 7:
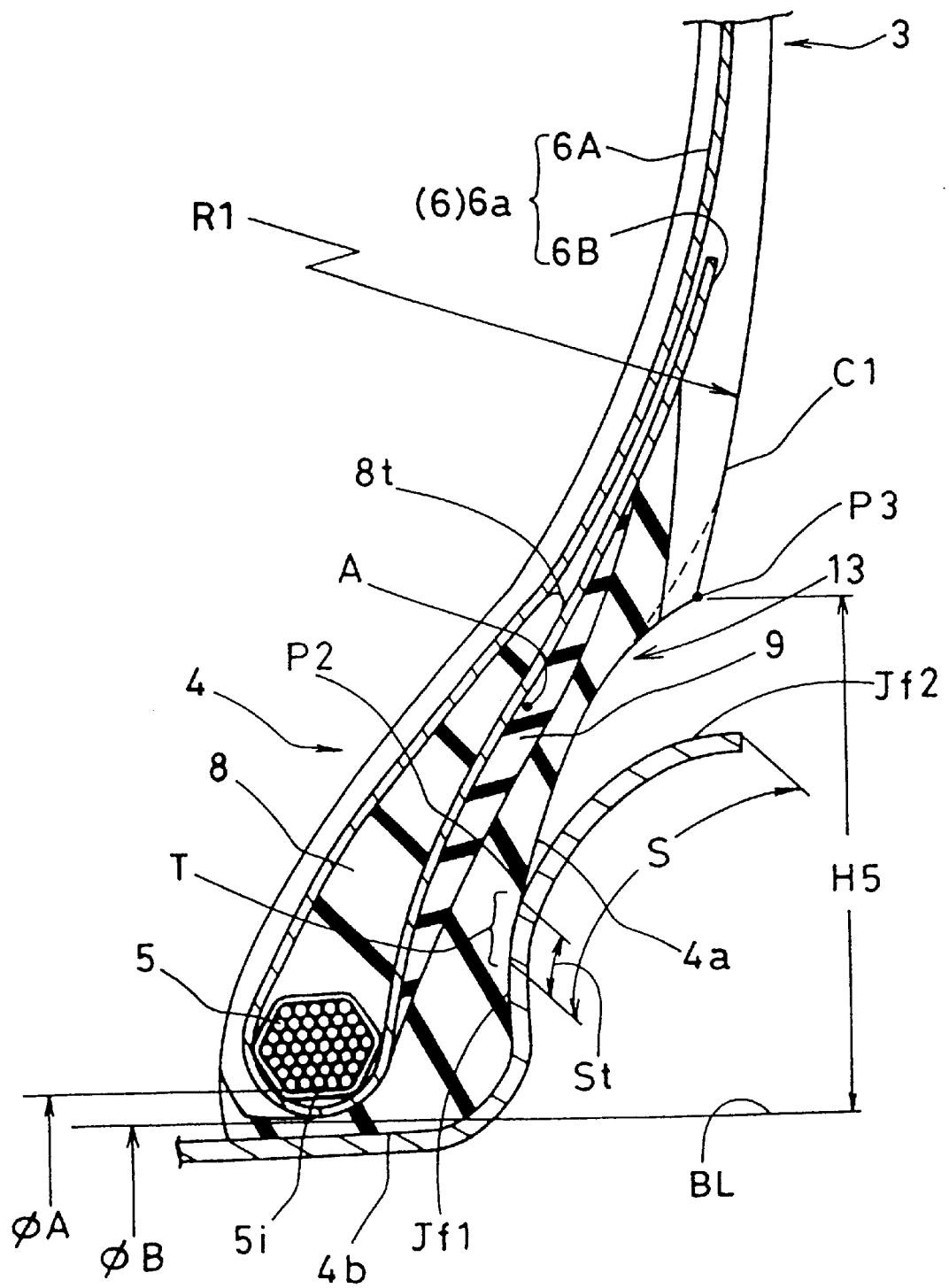
FIG. 7 is an enlarged cross sectional view of a bead portion showing another embodiment.

FIG. 7 shows another embodiment, wherein in a tire meridian section under the above-mentioned normal state, the outer surface of the bead portion 4 comes in contact with a flange arc surface Jf2 curved so as to have an arc angle of substantially 90 degrees and continued to the radially outer end of the rim flange surface Jf1 of a rim width part. In the example shown, the ratio (St/S) of the contact length St of the outer surface of the bead portion 4 with the flange arc surface Jf2 and the arc length S of the flange arc surface is 0.2 to 0.70. The other structures are substantially the same as the former embodiment.

In a conventional tire mounted on a five-degree-taper rim (shown in FIG. 12), as the outer surface 4a of the bead portion 4 comes in contact with the flange arc surface jf2 broadly under the normal state, separation failures often occur in the carcass ply turnup portion. In this embodiment, therefore, the area T (shown in FIG. 7) of the outer surface 4a of the bead portion 4 contacting with the flange arc surface Jf2 is specifically limited to an area smaller than the conventional one, thereby being capable of minimizing the amplitude of strain and frictional heat generation caused by a tire deformation during running such that the tire falls down towards the rim flange Jf. Thus, the occurrence of separation is further controlled by the synergism of this, the side packing rubber 9, the limited maximum principal strain and the like.

Figure 8:
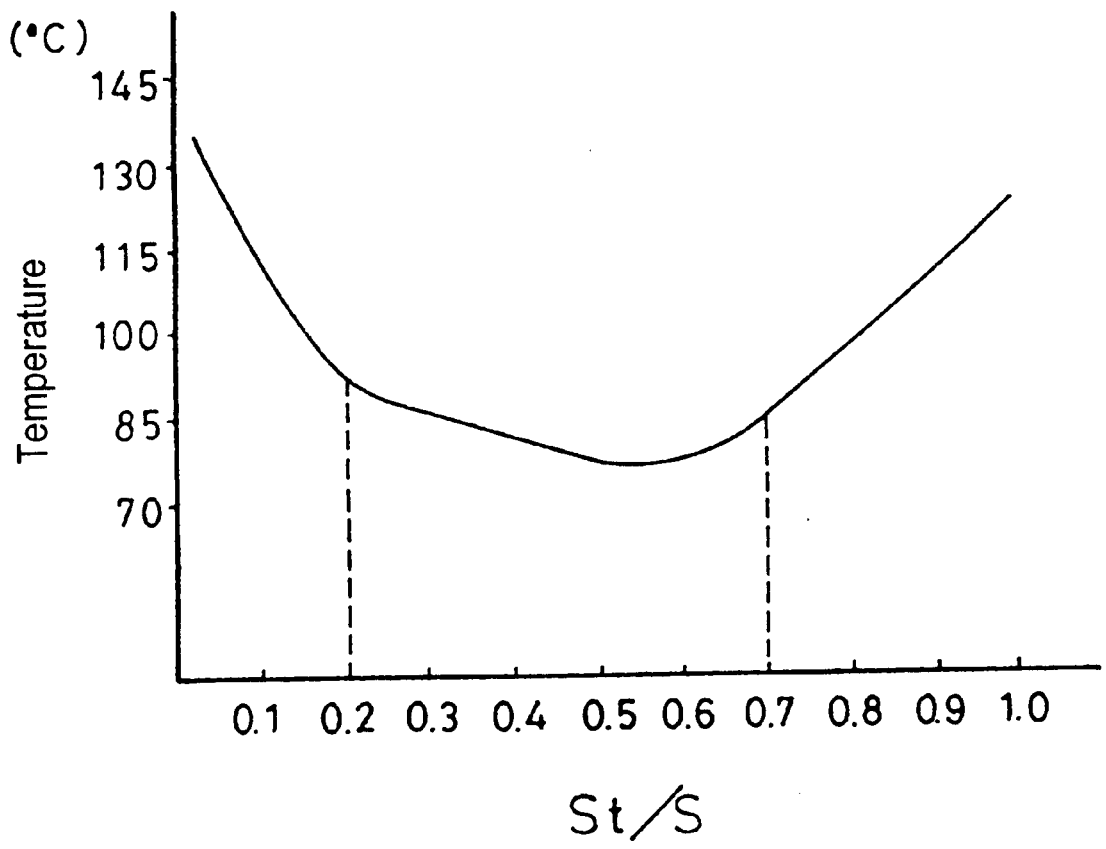
FIG. 8 is a graph showing a relationship between the ratio (St/S) and temperature of the bead portion.

The above-mentioned range of the ratio (St/S) could be obtained from the results of various tests conducted by the inventors. That is, tires were made by way of test changing the above-mentioned ratio (St/S), and a drum durability test was conducted to measure the temperature at the inside (point A of FIG. 7) of the bead portion, and the results shown in FIG. 8 were obtained. It was discovered that the bead portion 4 can be decreased in heat generation to a very low level, by setting the above-mentioned ratio (St/S) in the range of from 0.2 to 0.70, more preferably 0.4 to 0.65, still more preferably 0.50 to 0.65.

If the above-mentioned ratio (St/S) is less than 0.2, the contacting area T becomes too narrow, and the bending deformation of the bead portion 4 greatly increases, and as a result, the frictional heat generation increases. Tires having a ratio (St/S) more than 0.70 were about the same as the conventional tires. As the contacting area T excessively increases, the heat generation and strain increases, and the separation preventing effect can not be obtained. Incidentally, if the arc angle of the flange arc surface Jf2 is not less than 90 degrees, the arc length S is defined as the length corresponding to an arc angle of 90 degrees.

Further, in this embodiment, the outer surface of the bead portion 4 forms a curved surface portion 13 which is caved in toward the inside of the tire like an arc and extends radially outwardly from the outer contact point P2 which is the radially outmost point of the area T of the outer surface of the bead portion 4 contacting with the flange arc surface Jf2 of the above-mentioned rim flange Jf. Such arc-like curved surface portion 13 further decreases the rubber thickness of the bead portion 4 and reduces the internal friction of rubber to lessen the heat generation, which further helps to prevent separation failures.

Because the arc-like curved surface portion 13 is formed to accord with the profile of the flange arc surface Jf2 of the rim flange Jf when fallen down toward the rim flange, the curvature is not reversed even when it is fallen down and deformed, and further the friction between the arc-like curved surface portion 13 and the flange arc surface Jf2 of the rim flange Jf becomes very small. Therefore, heat generation and strain in the bead portion 4 can be reduced, and the occurrence of separation can be controlled.

As shown in FIG. 7, the height H5 of the radially outer end P3 of the arc-like curved surface portion 13 from the bead base line BL is 15 to 35%, preferably 20 to 30%, more preferably 22 to 28% (in this embodiment 21%) of the above-mentioned carcass section height Hc, and in this example, it is substantially equal to the height H1 of the above-mentioned bead apex 8. In this embodiment, the arc-like curved surface portion 9 meets the outer surface's arc C1 of the sidewall portion 4 which has a center on the tire hollow's side and a radius of curvature R1 so that the meeting part appears to be a circumferential crest line.

If the height H5 of the radially outer end of the above-mentioned arc-like curved surface portion 13 is lower than 15% of the carcass section height Hc, it becomes difficult to decrease the rubber thickness of the bead portion 4, and an effect to reduce the friction between the arc-like curved surface portion 13 and the flange arc surface Jf2 of the rim flange Jf tends to decrease. If more than 30%, there is a tendency for the rigidity of the bead portions 4 to decrease. As shown in this example, it is preferable, for preventing the bead rigidity from decreasing, to dispose the outer end P3 of the arc-like curved surface portion 13 at the substantially same position as or inward of the outer end 8t of the bead apex 8 which is made of hard rubber.

Further, in the tire meridian section, it is preferable to form the arc-like curved surface portion 13 by a single arc or a plurality of arcs. In case of a single arc, the radius of curvature thereof is preferably 20 to 30 % of the above-mentioned carcass section height Hc. Preferably, the arc-like curved surface portion 9 and the arc of the outer surface of the sidewall portion 4 are smoothly connected to each other as shown in FIG. 7 by a dotted line.

If the arc-like curved surface portion 13 is constructed so, the amount of deformation of the bead portion 4 when leaning toward the rim flange Jf becomes large. In connection with the size, measured in a vulcanizing mold, of conventional heavy duty tires to be mounted on a five-degree-taper rim in particular, the inside diameter of the bead seat surface 4b is set to be larger than the outside diameter of the rim seat surface Js. Thus, there is an interference between the outer surface of the bead portion and the rim flange surface. Therefore, the bead seat surface 4b is more moved when leaning and the heat generation in the bead portion 4 increases.

Figure 9:
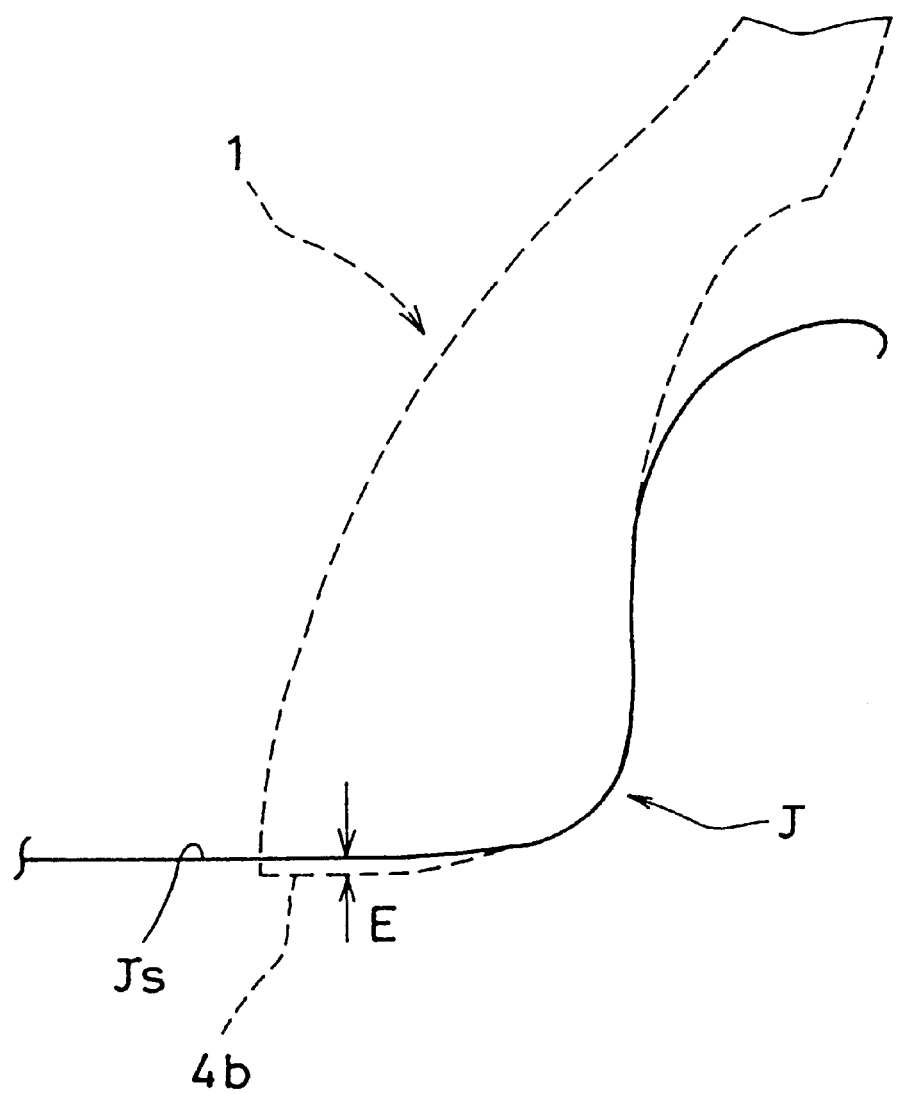
FIG. 9 is a partial cross sectional view for explaining an interference.

Therefore, in this embodiment, with regard to the size in the tire vulcanizing mold, by setting the inside diameter of the bead seat surface 4b less than the outside diameter of the rim seat surface Js as shown in FIG. 9 by a chain line, an interference is provided between the bead seat surface 4b and rim seat surface Js under the above-mentioned normal state, whereby a large movement of the bead seat surface Js when the tire 1 is loaded can be controlled, and the heat generation in the bead portion due to repetitions of deformation can be decreased, and a rubber failure in the bead base is controlled. Thus, the durability of the bead portion can be further improved.

As shown in FIG. 9, the maximum interference E between the rim seat surface Js on the fixed flange side and the bead seat surface of the tire under the in-mold size is preferably 0.5 to 3.0 mm. If the interference E is less than 0.5 mm, the effect to control a large movement of the bead seat surface 4b when loaded becomes decreased. If more than 3.0 mm, it becomes difficult to mount the tire on a rim. On the other hand, it is possible to dispose a cord (fabric) chafer to reinforce the bead seat surface 4b.

Figure 10:
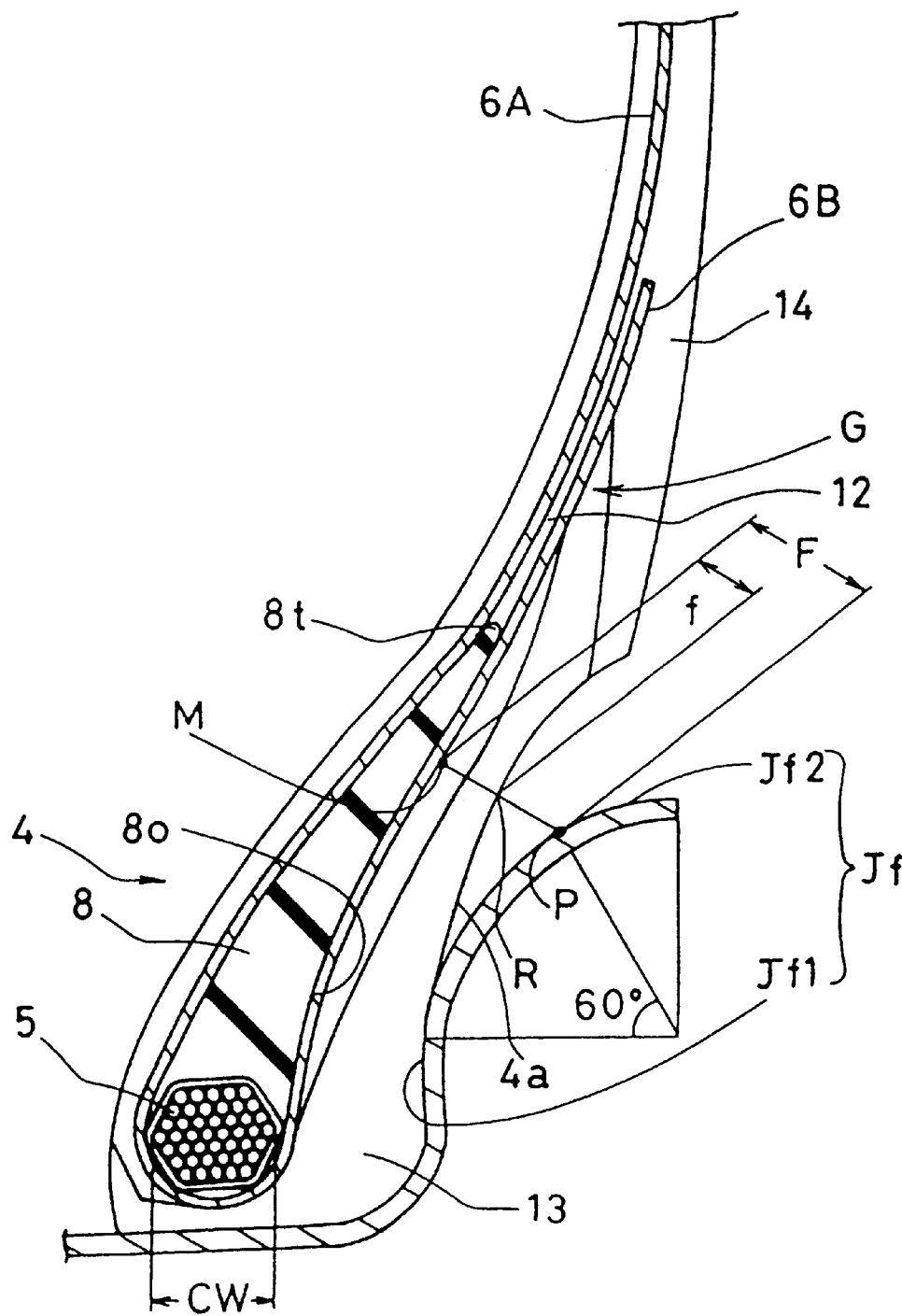
FIG. 10 is an enlarged cross sectional view of a bead portion showing another embodiment

Further, in this embodiment, as shown in FIG. 10, under the above-mentioned normal state, the rubber thickness is adjusted as follows:

Given that point R is the intersecting point of the outer surface of the bead portion 4 and a line. The line is drawn along the minimum distance F between the axially outer surface M of the carcass turnup portion 6B and a 60 degree position P on the flange arc surface Jf2 which corresponds to a 60 degree arc starting from the radially outer end of the rim flange surface Jf1.

The ratio (f/F) of the distance (f) between points (M and R) and the length (F) of the above-mentioned line is in the range of from 0.4 to 0.9.

From the results of tests conducted by the present inventors, the followings were discovered: separation failures in the bead portion 4 concentrates in the neighborhood of the above-mentioned point M of the line extending along the minimum distance F between the 60 degrees position P on the flange arc surface Jf2 which corresponds to a 60 degree arc from the radially outer end of the rim flange Jf1 and the axially outer surface M of the carcass turnup portion 6B; and heat generation in the bead portion 4 can be controlled by adjusting the rubber thickness relatively to the length (F) of the line, that is, the distance (f) between the above-mentioned (M and R), thereby preventing the separation failure.

Figure 11:
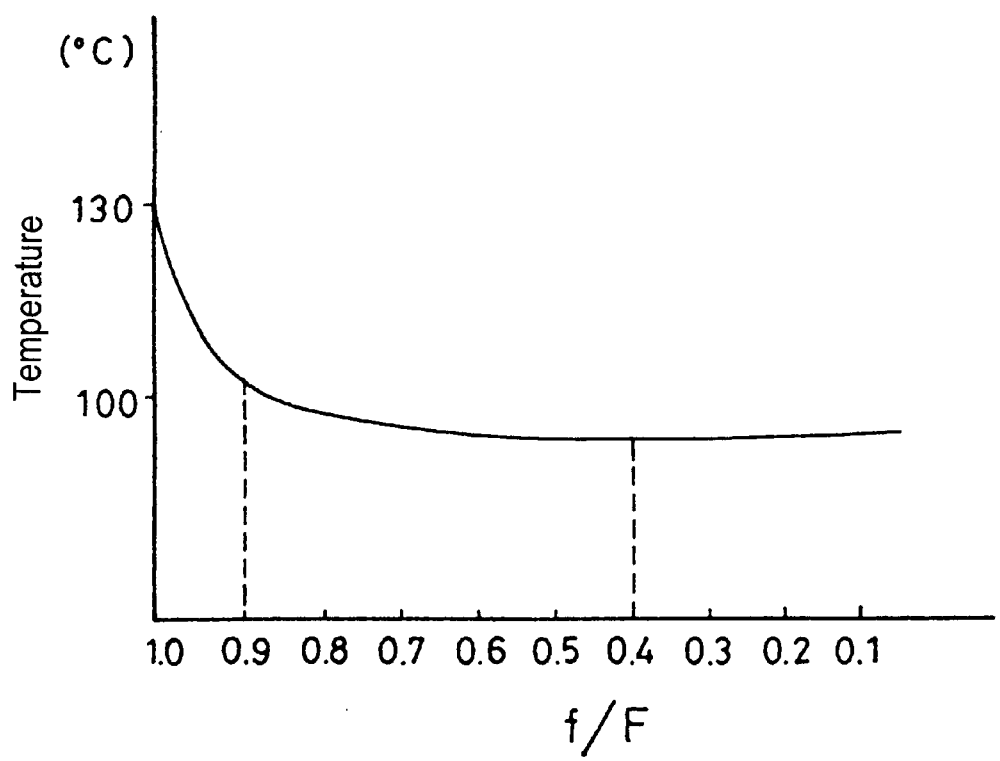
FIG. 11 is a graph showing a relationship between a ratio (f/F) and temperature of the bead portion.

Tires were made changing the above-mentioned ratio (f/F), and durability drum test was conducted to measure the temperature around the point (M). As shown in FIG. 11, if the ratio (f/F) exceeds 0.9, the bead rigidity is increased, but the opportunity to contact with the rim flange Jf is increased-and the heat generation increases. If the ratio (f/F) is less than 0.4, the bead portion becomes short of rubber thickness and thus the rigidity. As a result, the steering stability deteriorates, and structural breakdown can be caused.

As explained above, the controlling of the rubber thickness of the bead portion enhances the effect of the side packing rubber 9. Further, it helps to decrease the strain in the above-mentioned region Y, and the durability of the bead portion can be further improved.

The heavy duty radial tire 1 which is an embodiment has been detailed as above. In each of the above-mentioned embodiments, the bead portion 4 is not provided with a cord reinforcing layer separating from the carcass ply 6a and composed of a cord ply in which organic fiber cords or steel cords are arranged, which helps to decrease the tire weight and cost. The present invention is not limited to the disclosed embodiments and can be modified variously as far as it does not deviate from the gist of the present invention.

Working Example

Heavy duty radial tires of size 10.00R20 for five-degree taper rims were made according to the specifications given in Table 1 (Example tires 1 to 8 and a conventional tire) and tested for durability of the bead portion.

Common specifications to the tires are as follows:

Carcass

Number of ply: 1
Cord construction: Steel cord (3×0.20+7×0.23)
Cord angle: 90 degrees with respect to the tire equator
Cord count: 38/5 cm (at a position on the radially inside of the bead core)

Belt

Number of ply: 4
Cord construction: steel cord (3×0.20+6×0.35)
Cord angle with respect to the tire equator: +67/+18/−18/−18 degrees from inside
Cord count: 26/5 cm First, changing the length of the parallel portion, the maximum principal strain in the above-mentioned region Y, crack occurrence, and bead durability were compared with each other.

In this test, a side packing rubber was not disposed, and the moduli of rubber was as follows:
100% modulus Ms of Sidewall rubber: 15 kgf/sq.cm
100% modulus Ma of Bead apex rubber: 75 kgf/sq.cm
100% modulus Mc of Chafer rubber: 71 kgf/sq.cm
100% modulus Mt of carcass topping rubber: 42 kgf/sq.cm The tests are as follows.

Durability of Bead portion

Test tire mounted on a 7.50×20 standard rim and inflated to 1000 kPa and loaded with 9000 kgf was run on a drum at a speed of 20 km/h, and when any visible damage was caused, the running was stopped. And the ratio L1/L0 of the damage-occurring distance L1 to the target distance L0 of 10000 km was evaluated by an index based on the conventional tire being 100. The larger the value, the better the performance.

Maximum Principal Strain Measuring Test

As explained above, the existence of a peak and the maximum principal strain ∈m, ∈p were evaluated. (Standard rim: 7.50×20, Inner pressure: 800 kPa).

Crack Test

The test tire mounted on a 7.50×20 standard rim and inflated to 800 kPa was put in an ozone chamber where the ozone concentration was 40 pphm, and the temperature was 40 degrees, and the time spent until cracks occurred in the above-mentioned region Y was evaluated by an index based on the conventional tire being 100. The larger the value, the better the resistance to crack.

Tire Weight

The weight of a tire was measured, which is indicated by an index based on the conventional tire being 100. The test results are shown in Table 1.

TABLE 1

Figure 12:
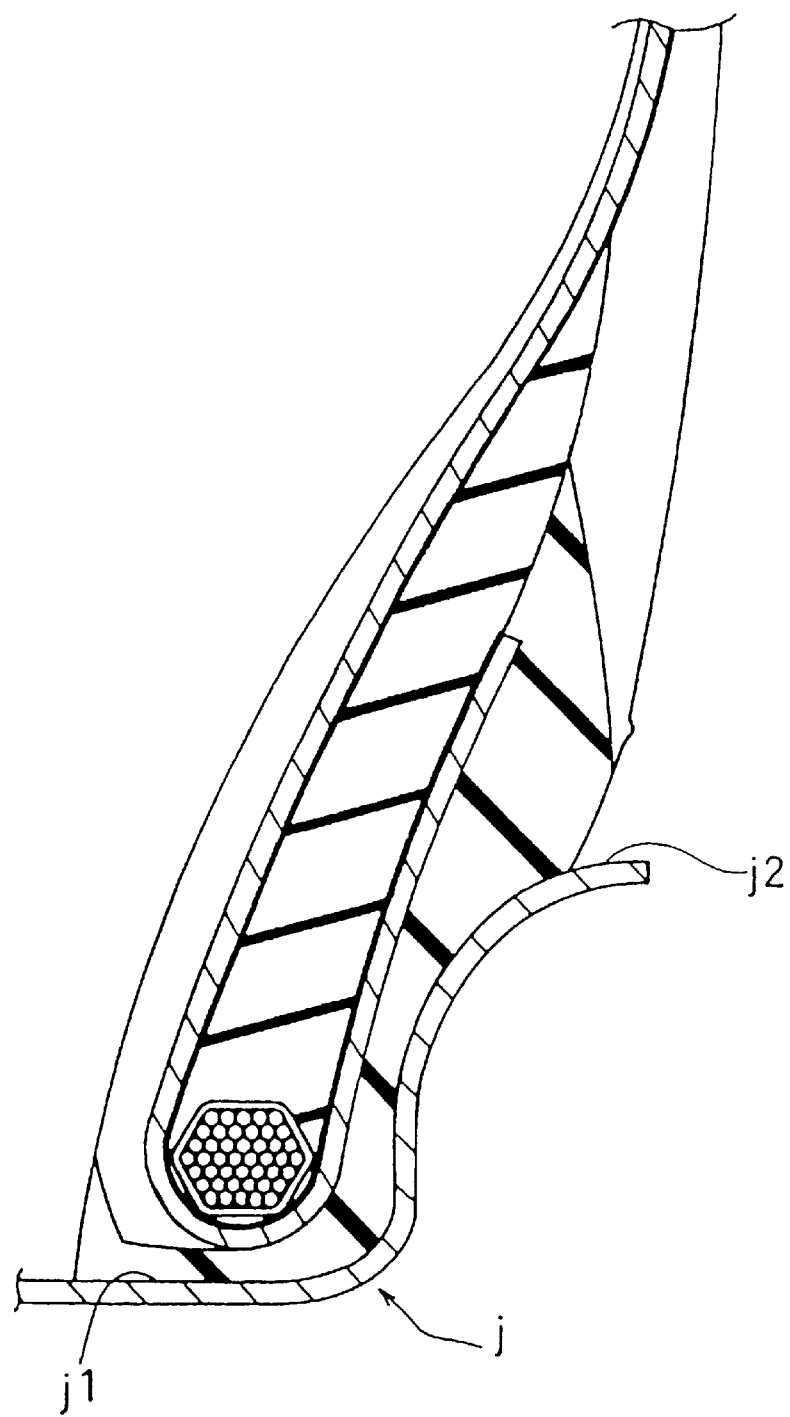
FIG. 12 is an enlarged cross sectional view of a bead portion of a conventional heavy duty radial tire.

|  | Ex.1 | Ex.2 | Ex.3 | Ex.4 | Ex.5 | Ex.6 | Conv. 1 |
|---|---|---|---|---|---|---|---|
| Length of Parallel portion L (mm) | 68 | 20 | 117 | 39 | 26 | 104 | 0 |
| Max. section width of Bead core CW (mm) | 13 | 13 | 13 | 13 | 13 | 13 | 13 |
| L/CW | 5.2 | 1.5 | 9.0 | 3.0 | 2.0 | 8.0 | 0 |
| Shape of Bead portion | FIG.2 | FIG.2 | FIG.2 | FIG.2 | FIG.2 | FIG.2 | FIG.12 |
| Max. Principal strain $\epsilon m$ (%) | 2.5 | 3.5 | 2.5 | 2.5 | 3.0 | 2.5 | 6.5 |
| $\epsilon m - \epsilon p$ (%) | 0.5 | 1.5 | 0.5 | 0.5 | 1.0 | 0.5 | 4.5 |
| Crack test (index) | 130 | 105 | 130 | 130 | 125 | 130 | 100 |
| Bead durability test (index) | 120 | 70 | 120 | 115 | 105 | 120 | 100 |
| Tire weight (index) | 95 | 92 | 103 | 94 | 93 | 101 | 100 |

Next, similar test were conducted, providing a side packing rubber and changing the rubber moduli as shown in Table 2. The test results are indicated by an index based on the conventional tire 2 being 100. The test results are shown in Table 2, Table 3.

TABLE 2

|  | Ex. 7 | Ex. 8 | Ex. 9 | Ex. 10 | Ex. 11 | Ex. 12 | Ex. 13 | Ex. 14 | Conv. 2 |
|---|---|---|---|---|---|---|---|---|---|
| H1/Hc ratio Bead apex (%) | 25 | 25 | 25 | 25 | 25 | 25 | 25 | 25 | 41 |
| H2/Hc ratio Carcass turned up portion (%) | 41 | 41 | 19 | 61 | 41 | 41 | 41 | 41 | — |
| Side packing rubber |  |  |  |  |  |  |  |  |  |
| H3/Hc ratio Inner end height (%) | 4.5 | 4.5 | 4.5 | 4.5 | 4.5 | 4.5 | 4.5 | 4.5 | — |
| H4/Hc ratio Outer end height (%) | 31 | 31 | 31 | 31 | 31 | 31 | 31 | 31 | — |
| 100% modulus (kgf/sq.cm) |  |  |  |  |  |  |  |  |  |
| Ms Sidewall rubber | 15 | 15 | 15 | 15 | 15 | 15 | 15 | 15 | 15 |
| Mp Side packing rubber | 50 | 50 | 50 | 50 | 50 | 50 | 10 | 70 | — |
| Ma Bead apex | 75 | 75 | 75 | 75 | 75 | 75 | 75 | 75 | 75 |
| Mc Chafer rubber | 71 | 80 | 71 | 71 | 71 | 71 | 71 | 50 | 71 |
| Mt Carcass topping rubber | 42 | 42 | 42 | 42 | 42 | 42 | 42 | 42 | 42 |
| St/S ratio Contact between Outer surface of bead portion and Flange arc surface (%) | 58 | 58 | 58 | 58 | 19 | 71 | 58 | 58 | 89 |
| f/F ratio Rubber thickness in Bead portion (%) | 80 | 80 | 80 | 80 | 80 | 80 | 80 | 80 | 100 |
| L/cw ratio Length of Parallel portion | 5.0 | 5.0 | 1.8 | 1.0 | 5.0 | 5.0 | 5.0 | 5.0 | — |
| Q/D ratio Carcass cord spacing | 1.5 | 1.5 | 1.5 | 1.5 | 1.5 | 1.5 | 1.5 | 1.5 | 1.0 |
| Max. principal strain $\epsilon m$ in Region Y (%) | 3 | 3 | 3 | 3 | 3 | 3 | 3 | 3 | 8.5 |
| ($\epsilon m - \epsilon p$) (%) | 1 | 1 | 1 | 1 | 1 | 1 | 1 | 1 | 5 |
| Interference of Bead seat surface (mm) | 1.5 | 1.5 | 1.5 | 1.5 | 1.5 | 1.5 | 1.5 | 1.5 | 0 |
| Durability of Bead portion (index) | 200 | 105 | 115 | 150 | 125 | 130 | 101 | 102 | 100 |
| Crack Test (index) | 300 | 300 | 300 | 300 | 300 | 300 | 300 | 300 | 100 |
| Tire weight (index) | 92 | 92 | 90 | 93 | 90 | 95 | 92 | 92 | 100 |

*Hc = Carcass section height

Furthermore, similar tests were made, changing the rubber moduli and the above-mentioned ratio (St/S). The test results are shown in Table 3.

TABLE 3

|  | Ex.15 | Ex.16 | Ex.17 | Ex.18 |
|---|---|---|---|---|
| H1/Hc ratio Bead apex (%) | 25 | 25 | 25 | 25 |
| H2/Hc ratio Carcass turned up portion (%) | 41 | 19 | 61 | 41 |
| Side packing rubber |  |  |  |  |
| H3/Hc ratio Inner end height (%) | 4.5 | 4.5 | 4.5 | 4.5 |
| H4/Hc ratio Outer end height (%) | 31 | 31 | 31 | 31 |
| 100% modulus (kgf/sq.cm) |  |  |  |  |
| Ms Sidewall rubber | 15 | 15 | 15 | 15 |
| Mp Side packing rubber | 50 | 50 | 50 | 50 |
| Ma Bead apex | 75 | 75 | 75 | 75 |
| Mc Chafer rubber | 71 | 71 | 71 | 71 |
| Mt Carcass topping rubber | 42 | 42 | 42 | 42 |
| St/S ratio Contact between Outer surface of bead portion and Flange arc surface (%) | 58 | 58 | 58 | 58 |
| f/F ratio Rubber thickness in Bead portion (%) | 80 | 80 | 80 | 30 |
| L/cw ratio Length of Parallel portion | 5.0 | 1.8 | 6.0 | 5.0 |
| Q/D ratio Carcass cord spacing | 2.5 | 2.5 | 2.5 | 2.5 |
| Max. principal strain $\epsilon m$ in Region Y (%) | 3 | 3 | 3 | 3 |
| ($\epsilon m - \epsilon p$) (%) | 1 | 1 | 1 | 1 |
| Interference of Bead seat surface (mm) | 1.5 | 1.5 | 1.5 | 1.5 |
| Durability of Bead portion (index) | 200 | 115 | 150 | 125 |
| Crack Test (index) | 300 | 300 | 300 | 300 |
| Tire weight (index) | 92 | 90 | 93 | 90 |

*Hc = Carcass section height

From those test results, it was confirmed that Example tires was improved in the durability of the bead portion. Further, it was confirmed that Example tires have no peak of the maximum principal strain $\epsilon m$ in the region Y and the value thereof is not more than 4.0%.

Furthermore, it was confirmed that ϵm−ϵp is less than 2% and the relative difference in strain is decreased.

It may be understood that Example tires are superior in the resistance to crack with relation to those results.

Further, as to other tire sizes, similar good test results could be obtained.

What is claimed is:

1. A heavy duty radial tire comprising a carcass including a carcass ply made of cords arranged at an inclination angle of 70 to 90 degrees with respect to the tire equator, the carcass ply comprising a main portion extending from a tread portion to a bead core in a bead portion through a sidewall portion, the main portion integrally provided with a turnup portion, the turnup portion turned up from the axially inside to the outside at said bead core and extending radially outwardly, and a bead apex disposed between the main portion and turnup portion of the carcass ply extending and tapering radially outwardly from the bead core, wherein said turnup portion extends radially outwards along the axially outer surface of said bead apex, and then from the radially outer end of the bead apex, it has a portion extending substantially parallel with and adjacent to the main portion of the carcass ply, and the length L of the parallel portion is 1.0 to 8.0 times the maximum section width CW of the bead core.

2. The heavy duty radial tire according to claim 1, adapted to be mounted on a five-degree-taper rim, wherein the carcass consists of a single carcass ply and the height H2 of the radially outer end of the turnup portion is 30 to 60 % of the carcass section height Hc.

3. The heavy duty radial tire according to claim 1, wherein when the tire is mounted on a standard rim and the inflated condition is changed from a tentatively assembled state in which the inner pressure is 0.5 kgf/sq.cm to a normal state in which the inner pressure is standard, the maximum principal strain ϵm of the surface of the region between a maximum tire width point P1 where the outer surface of the tire is axially outmost and an outer contact point P2 which is the radially outer point of a region of the bead portion contacting with a rim flange is not more than 4%, and the difference (ϵm−ϵp) between the maximum principal strain ϵm of said region and the maximum principal strain ϵp at the maximum tire width point P1 is less than 2%.

4. The heavy duty radial tire according to claim 1, wherein the bead portion is provided on the axially outer surface of the turnup portion of the carcass ply with a side packing rubber having a 100% modulus Mp of 14 to 65 kgf/sq.cm, and the radially outer end of the side packing rubber is disposed outside the outer end of the bead apex.

5. The heavy duty radial tire according to claim 4, wherein the bead portion is provided with a chafer rubber having a 100% modulus Mc of 55 to 75 kgf/sq.cm, the chafer rubber covering the axially outer surface of the side packing rubber and being exposed in the outer surface of the bead portion and bead seat, and the chafer rubber is connected with a sidewall rubber having a 100% modulus Ms of 10 to 20 kgf/sq.cm and defining the outer surface of the sidewall portion.

6. The heavy duty radial tire according to claim 1, wherein in a normal state in which the tire is mounted on a standard rim and inflated to a standard inner pressure and loaded with no load, the bead portion comes into contact with a flange arc surface, the flange arc surface being curved with a substantially 90 degree arc and extending to the radially outer end of a rim flange surface, the rim flange surface passing a rim width position of the rim flange, and the ratio (St/S) of the contact length St of the outer surface of the bead portion with the flange arc surface to the arc length S of the flange arc surface is 0.2 to 0.70.

7. The heavy duty radial tire according to claim 6, wherein the bead portion has an arc-like curved surface portion, the arc-like curved surface portion sinking towards the inside of the tire and extending radially outwardly from an outer contact point which is the radially outer point of a region contacting with the rim flange under the normal state, and said ratio (St/S) is 0.4 to 0.65.

8. The heavy duty radial tire according to claim 6, wherein in the bead portion under said normal state, given that R is the intersecting point of a line extending along the minimum distance F between the axially outer surface M of the carcass turnup portion and a 60 degree position P on the flange arc surface which corresponds to the angle of a 60 degree arc from the radially outer end of the rim flange surface with the outer surface of the bead portion, the ratio f/F of the distance f between M and R to the length F of the line is 0.4 to 0.9.

9. The heavy duty radial tire according to claim 6, wherein the bead portion has an interference between the bead seat surface and rim seat surface.

* * * * *